D. D. DRUMMOND,
Assignor of one-half to R. A. DRUMMOND.
DEVICE FOR CONVEYING AND PRECIPITATING DUST ARISING FROM WOOD WORKING MACHINERY.
No. 10,568. Reissued Mar. 10, 1885.
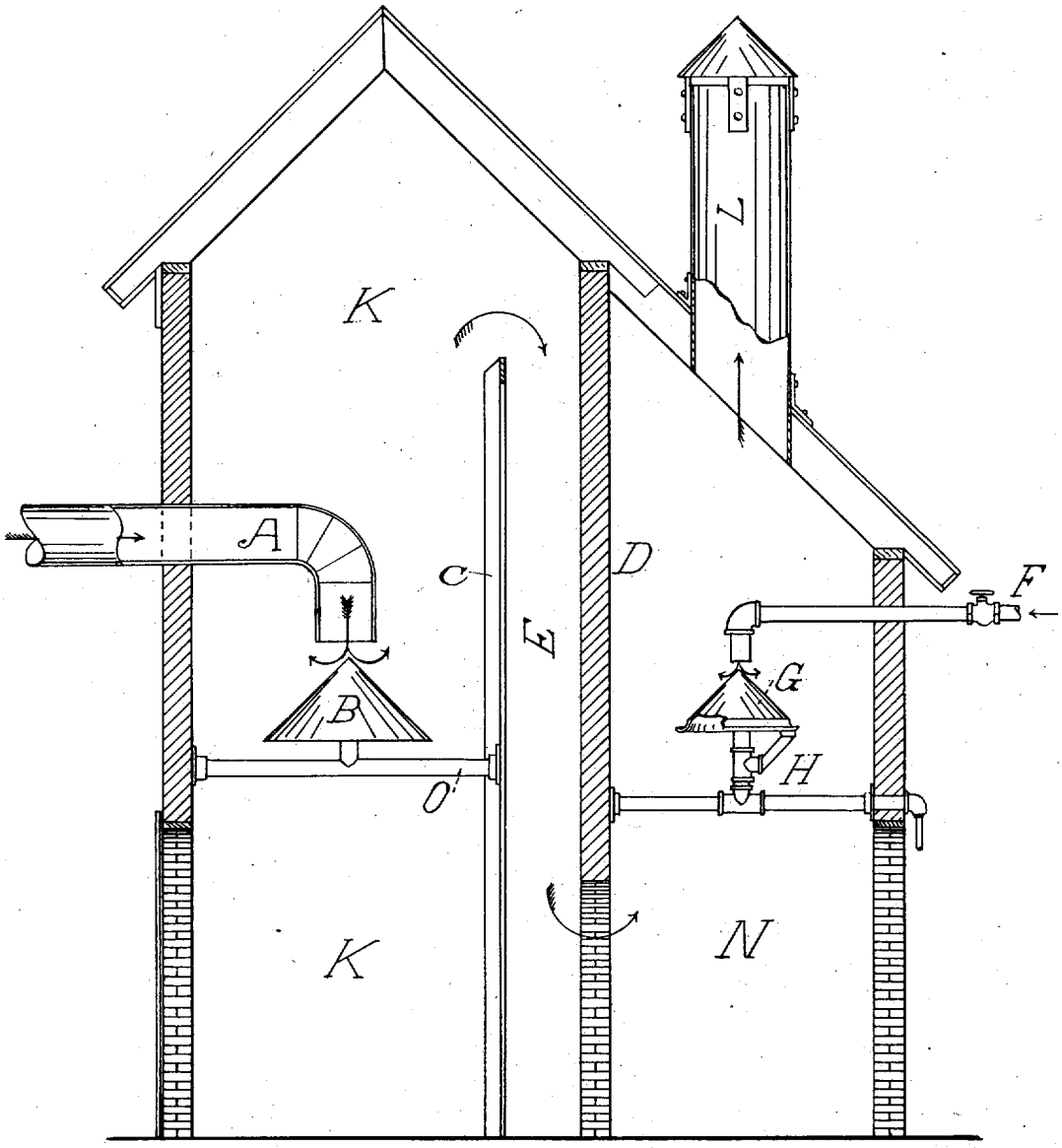
WITNESSES:
Hiram H. Scoville
Thos J. Gray
INVENTOR
David D. Drummond
N. PETERS Photo-Lithographer, Washington, D. C.

UNITED STATES PATENT OFFICE.

DAVID D. DRUMMOND, OF CHICAGO, ILLINOIS, ASSIGNOR OF ONE-HALF TO ROBERT A. DRUMMOND.

DEVICE FOR CONVEYING AND PRECIPITATING DUST ARISING FROM WOOD-WORKING MACHINERY.

SPECIFICATION forming part of Reissued Letters Patent No. 10,568, dated March 10, 1885.

Original, No. 301,223, dated July 1, 1884. Application for reissue filed November 5, 1884.

*To all whom it may concern:*

Be it known that I, DAVID D. DRUMMOND, a citizen of the United States, residing in Chicago, in the county of Cook and State of Illinois, have invented new and useful Improvements in Devices for Conveying and Precipitating Dust Arising from Wood-Working Machinery, &c., of which the following is a specification.

To relieve those who attend on wood-working and analogous machines from the annoyance and danger of a dust-laden atmosphere, it has long been customary to remove the shaving-dust or other débris from such machines by means of a blast of air, whereby such débris, &c., are conveyed through a conduit and discharged at some suitable distant place; but the greater portion of said débris is valuable as fuel, and it is highly desirable that the blast-air shall be purified and freed from dust before its final escape to the outer atmosphere. This purification can only be effected rapidly by moisture.

The object of my invention is to separate the heavier shavings, sawdust, &c., in a dry state fit for immediate use as fuel, and to wet and precipitate the fine dust by itself in another place before the final discharge of the blast-air into the outer atmosphere.

My invention consists in providing suitable mechanical appliances for utilizing steam, preferably from the exhaust, (being the more economical,) for the purpose of precipitating and collecting the dust created principally by wood-working machinery of all kinds, and to separate such dust from coarser or heavier materials—such as shavings, &c.—so that the blast-air may be returned to the outer atmosphere pure and freed from dust. The material to be cleansed and separated from the dust it contains is conveyed to a receiving room, box, or other suitable structure by means of a fan or fans, or any method whatsoever, where the coarser parts—such as shavings, &c.—will immediately fall to the ground by their own gravity, while the finer particles and dust will be carried farther and be dampened with steam and precipitated, and the air, deprived of its dust, will be discharged again into the outer atmosphere, so that the débris drawn away from the machinery may be recovered, the essential part of my invention being a duct to convey the shavings and dust, an enlargement of said duct to constitute a settling-chamber, and a device for introducing and distributing steam to dampen and precipitate the dust before the blast-air escapes to the outer atmosphere.

I am aware that coarser or heavier particles have been sorted and sifted out from finer or lighter particles while being carried by a blast of air along a passage way or conduit having lateral perforations, which said particles would reach and pass through sooner or later, according to the existing balance between gravity and the force of the blast. In this way cereal grains, comminuted minerals, &c., have been sorted, sifted, and separated.

I am also aware that air has been purified and floating dust precipitated by means of an aqueous shower.

I am also aware that steam has been injected into the blast-conduit from wood-working and analogous machines, to wet the shavings, dust, &c., and cause a precipitation of the same after being discharged from said conduit. To effect this, I construct a shavings-tower with two compartments, K N, or equivalents of such, as shown in the drawings herewith and forming a part hereof.

The figure shows a sectional view of a shavings-tower, in which A represents the ordinary flue connected with the fan and entering said shavings-tower discharges the shavings and dust therein.

For distributing the shavings, and preventing their accumulation in a pile immediately in front of the outlet and checking the force of the current, a conical deflector or distributer, B, is employed, its apex being located centrally beneath the discharge end of the main air-pipe A. Said distributer is attached to and supported by the brace O. The shavings and heavier matters carried by the air-blast will be immediately deposited, while the finer particles and dust will be carried into the chamber N, where steam is distributed through the air, and the dust wetted thereby and caused to precipitate before the air escapes from said compartment N into the outer atmosphere.

The object of two compartments is to cause the heavier shavings, &c., to be deposited dry and separate from the dampened dust, and to effectually secure this separation I erect a screen, C, before the opening in the partition D, through which the dust-ladened air passes from the compartment K to the compartment N. This screen forms an air-passage, E, through which the dust is carried by the modified current into the steam-compartment N at such a point that before escaping through the air-vent L it is brought in contact with the steam discharging through the steam-pipe F.

To thoroughly distribute the steam through the surrounding atmosphere, I use a cone, G, similar to the cone B, but having a trough around its base to receive the products of condensation and discharge it in waste-pipe H.

Operation: The débris entering tower K through pipe A is thrown upon the distributer B, whereby the current of air and débris carried by it are distributed and the débris scattered, permitting the heavier portion to fall, while the dust rises and passes through the passage E into the chamber N. As the air charged with dust rises after entering chamber N, it encounters the steam distributed by the cone G, and condenses the same, and this in turn precipitates the dust through the minute subdivision of the particles of moisture, while the air rises cleansed and purified and escapes through air-vent L. It is evident that fair results in the precipitation of dust can be obtained in a single chamber in which to admit both air and steam, in which case the dust and shavings would be thrown down together; but by the use of an auxiliary chamber in which to bring the lighter portions of the débris in contact with steam the dust and shavings are separated and the shavings kept dry for fuel, and that distributers differing in form and construction from cones B and G may be substituted. I therefore do not confine myself to the use exclusively of separate chambers for air and steam, nor to any particular form of construction of distributers B and G.

What I claim as new is—

1. A receiving room, box, or other suitable structure for a settling-chamber combined with a wood-working or analogous machine, and an imperforate pipe or conduit to convey air with shavings and other débris from said machine and discharge said débris into said chamber, an outlet-pipe for the escape of said air from said chamber, and a distributer of steam within said chamber and near said outlet, whereby steam may be distributed in the atmosphere of said chamber prior to its exit therefrom, and the floating dust wetted and caused to precipitate separate from the heavier shavings, &c.

2. A receiving room, box, or other suitable structure for a settling-chamber combined with a wood-working or analogous machine, an imperforate pipe or conduit to convey air and débris from said machine and discharge the same into said chamber, an outlet-pipe for escape of said air from said chamber, a distributer of steam to wet and precipitate the floating dust within said chamber, and a secondary chamber connected with said outlet and steam-distributer to inclose and confine the steam to the immediate vicinity of said outlet, for the purpose set forth.

3. A receiving room, box, or other structure suitable for a settling-chamber, having a perforated partition to divide said chamber into two parts, combined with a wood-working or analogous machine, an imperforate pipe or conduit to convey air and débris away from said machine and discharge the same into said chamber on one side of said partition, an outlet-pipe for the final escape of said air, and a distributer of steam within said chamber at the other side of said partition, to wet and precipitate the floating dust within said steam-chamber on the outlet side of said partition.

4. In a dust-controlling apparatus, an air and shavings inlet pipe, A, settling-chamber K, and shavings-distributer B therein, in front of said pipe, to cause an even distribution of the shavings and dust, combined with a screen, C, and partition D, constituting a channel, E, and a steam-chamber, N, and a steam-distributer located in said steam-chamber, for the purposes set forth.

5. A shavings-inlet pipe discharging into a chamber having in front of said pipe a distributer to distribute the shavings and break up the current of air, a secondary chamber connected with said first-named chamber by a passage which communicates with the top of the first-named chamber and with the bottom of said secondary chamber, and an air-vent in said secondary chamber combined with a steam-discharging pipe in said secondary chamber and a distributer for the discharged steam, whereby the coarser shavings, &c., will be deposited dry in the first-named chamber and the fine dust be precipitated in said secondary chamber before the blast-air escapes through said air-vent.

DAVID D. DRUMMOND.

Witnesses:
HIRAM H. SCOVILLE,
THOS. J. GRAY.